L. BASTET.
Galvanic Batteries.

No. 138,602. Patented May 6, 1873.

Witnesses:

Inventor:
Louis Bastet
per ——
Attorneys.

UNITED STATES PATENT OFFICE.

LOUIS BASTET, OF NEW YORK, N. Y.

IMPROVEMENT IN GALVANIC BATTERIES.

Specification forming part of Letters Patent No. 138,602, dated May 6, 1873; application filed November 18, 1872.

*To all whom it may concern:*

Be it known that I, LOUIS BASTET, of New York, in the county of New York and State of New York, have invented an Improvement in Electric Batteries, of which the following is a specification:

The invention will first be fully described and then clearly pointed out in the claim.

Figure 1:
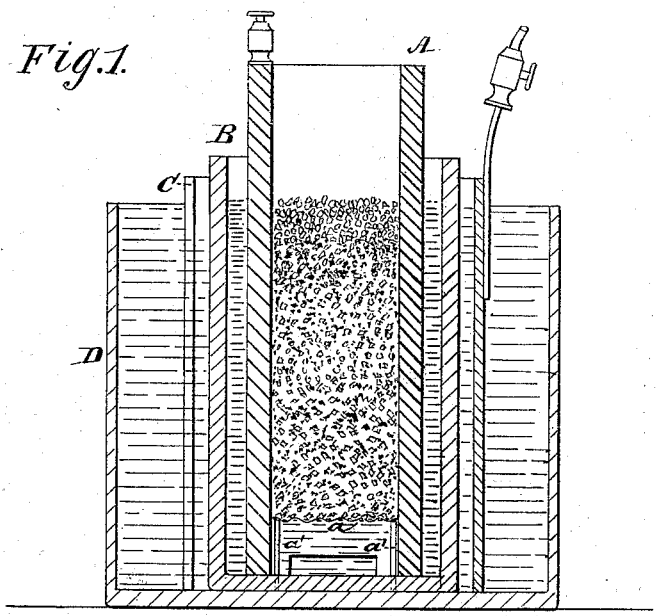
Figure 2:
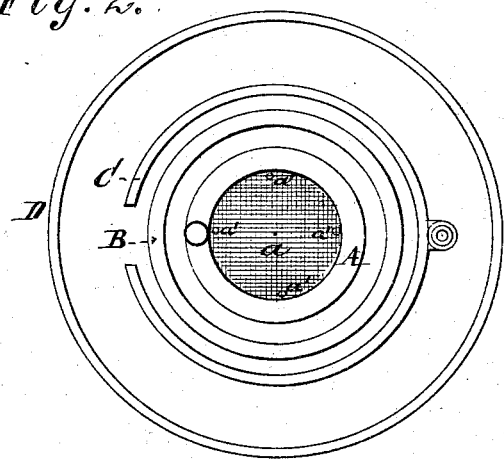

Figure 1 is a vertical section. Fig. 2 is a plan view.

A in the drawing represents the carbon cylinder; B, the porous cup; C, the zinc cylinder; and D, the outer vessel or casing. The carbon cylinder A, shown in drawing, is provided with a sieve, $a$, which supports the salts of copper and soda or potash, and with a stud, $a'$, screwed vertically into the edge of rim. In this carbon cylinder is placed three ounces of some cupric salt, preferably the sulphate, and three ounces of nitrate of soda. The porous cup is then filled with diluted sulphuric acid, having a strength of about 40° Baumé.

If I employ nitrate of potash I then use four ounces of copper salt to two ounces of potash.

Instead of dipping the ordinary zinc cylinder in mercury, I use the zinc in its natural state, and remedy the objection thereto by applying two ounces of nitro-hyposulphate of sodium or potassium. This is placed in the outer vessel D, which is then filled up with water and forms a neutralizer for the carbonic-acid gas generated by the oxidation of the zinc. It will also answer for an indefinite number of succeeding charges by simply taking about eight ounces of the solution of the preceding charge and applying it in the outer vessel for the next charge.

Of course, the battery may vary in size, and the ingredients of the compound slightly vary in proportions, without departing from the principle of my invention.

By repeated practical experiments I have found that this cupric sodium and sulphuric acid compound may be used with or without a porous cell, or in any battery.

I propose to prepare for sale the compound of cupric and soda or potash salts in about the proportions above specified, and also a solution of said compound in sulphuric acid, either ready for application to batteries in the manner above described.

Individuals who use batteries are constantly finding their zinc cups or cylinders impracticable and are compelled to have them often dipped in quicksilver. This is entirely prevented and the quicksilver application rendered entirely unnecessary by the use of nitro-hyposulphate of sodium or potassium.

The advantages of the cupric and soda or potash compound are, its cheapness, constancy of current, durability, and the entire freedom of the carbon from crystals of alum and polarization.

Having thus described my invention, what I claim as new, and desire to secure by Letters Patent, is—

1. An alkaline nitrate, a copper sulphate, and sulphuric acid, united to form the negative, combined in a porous-cell carbon-battery with the nitro-hyposulphate of sodium for a positive, as described, to enable the zinc to be used without amalgamation.

2. The application of a nitro-hyposulphate of sodium or potassium to electric batteries, as and for the purpose described.

L. BASTET.

Witnesses:
SOLON C. KEMON,
CHAS. A. PETTIT.